United States Patent
Roberts et al.

(10) Patent No.: US 6,622,866 B2
(45) Date of Patent: Sep. 23, 2003

(54) JEWEL CASE PACKAGING SYSTEM FOR RECORDING MEDIA

(75) Inventors: Gregory D. Roberts, Breckenridge, MN (US); William L. Hauer, Oakdale, MN (US); Kevin S. McFadden, Lakeville, MN (US)

(73) Assignee: Imation Corp., Oakdale, MN (US)

(*) Notice: Subject to any disclaimer, the term of this patent is extended or adjusted under 35 U.S.C. 154(b) by 31 days.

(21) Appl. No.: 09/991,615

(22) Filed: Nov. 19, 2001

(65) Prior Publication Data

US 2003/0094388 A1 May 22, 2003

(51) Int. Cl.7 .............................................. B65D 85/57
(52) U.S. Cl. ..................... 206/473; 206/308.1; 206/307
(58) Field of Search .............................. 206/307, 308.1, 206/387.13, 473, 307.1, 309

(56) References Cited

U.S. PATENT DOCUMENTS

| 3,640,379 | A | * | 2/1972 | Weingarden ........... 206/387.13 |
| 4,979,525 | A | * | 12/1990 | Chiou ..................... 132/286 |
| 5,232,089 | A | * | 8/1993 | Kim ..................... 206/308.1 |
| D441,915 | S | | 5/2001 | Wardlaw |
| 6,443,306 | B1 | * | 9/2002 | Davies et al. .............. 206/473 |

FOREIGN PATENT DOCUMENTS

| DE | 43 32 791 A1 | * | 9/1994 |
| WO | WO 00/72312 A2 | | 11/2000 |
| WO | WO 00/79526 A1 | | 12/2000 |
| WO | WO 01/07216 A1 | | 2/2001 |

* cited by examiner

Primary Examiner—David T. Fidei
(74) Attorney, Agent, or Firm—Eric D. Levinson

(57) ABSTRACT

One or more pieces of recording media are contained within a single package having a conventional jewel case form factor.

21 Claims, 2 Drawing Sheets

JEWEL CASE PACKAGING SYSTEM FOR RECORDING MEDIA

FIELD OF THE INVENTION

This invention concerns packaging for recording media, and particularly packaging systems in which multiple pieces of media are held in a single jewel case.

BACKGROUND OF THE INVENTION

In addition to the traditionally insatiable demand of consumers for inexpensive and inexhaustible data storage, data recording and electronic playback systems must also satisfy consumer demand for portability of systems and media, and vendor demands for packaging that effectively promotes sales without encouraging loss of inventory by way of theft. One successful example of commercially successful packaging is the conventional jewel case in which many forms of disc-based recording media are shipped, stocked, and sold. It accommodates conventionally sized "3.5 inch" (120 mm) diameter media such as CD, DVD, CD-R, CD-RW, and the like.

SUMMARY OF THE INVENTION

In one aspect of the invention, one or more pieces of recording media are contained within a single package having a conventional rectangular jewel case form factor.

BRIEF DESCRIPTION OF THE DRAWINGS

The accompanying drawings show a particular embodiment of the invention as an example, and do not limit the scope of the invention.

DETAILED DESCRIPTION

In general terms, the invention provides a packaging scheme in which one or more pieces of recording media are contained within a single package having the conventional jewel case form factor. The form factor of the recording media pieces is sufficiently small enough for several individual pieces of media to be held within a conventional jewel case, if desired. This permits the use of existing jewel case manufacturing equipment and processes where applicable.

Figure 1:
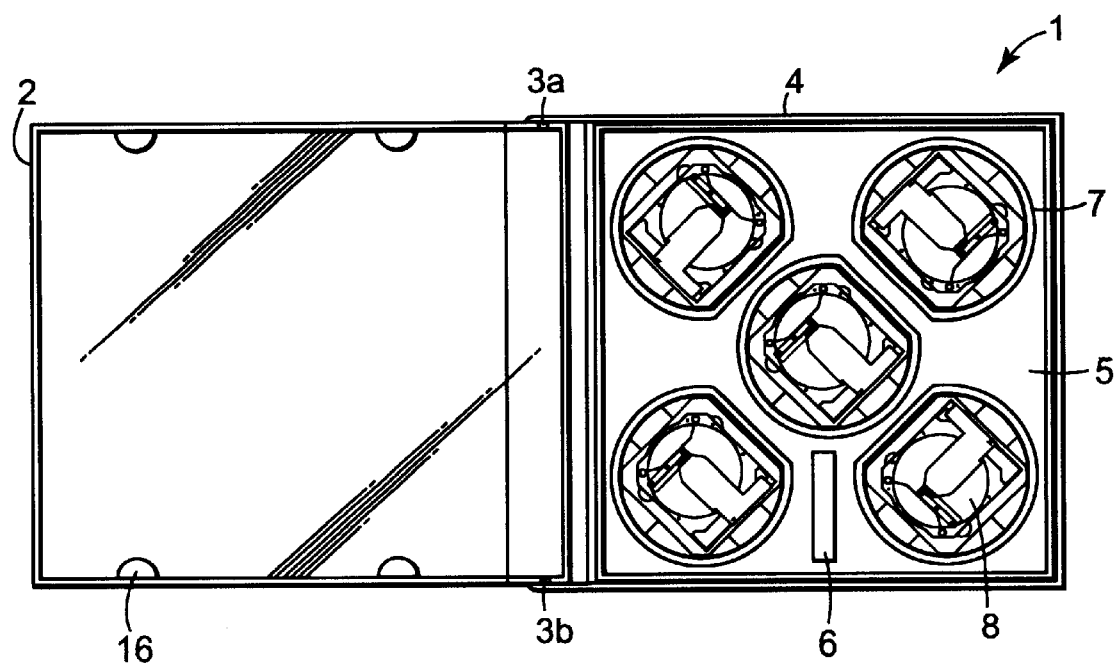
FIG. 1 is a front view of an embodiment of the invention.

FIG. 1 is a general schematic diagram of jewel case 1. Jewel case 1 has a top cover 2 which is hinged by two hinge pins 3a and 3b to a base 4. Cover 2 pivots between an open position in which the contents of jewel case 1 are accessible and a closed position in which they are not accessible. While small deviations are possible, the preferred embodiment is the same or approximately the same dimensions as the conventional "10 mm" jewel case, i.e., a shallow rectangular box measuring approximately about 140 mm wide, 125 mm high, and 10 mm in thickness when closed.

Cover 2, hinge pins 3a and 3b, and base 4 may be constructed of any rigid, durable material, but transparent polymers are preferred, especially for cover 2. Cover 2 is preferably fabricated of a transparent material so that either media pieces 8 are visible, or so that a printed sheet or a booklet (neither shown) may be placed inside cover 2, typically by sliding it under one or more integrally molded tabs 16 in a conventional manner. The number and location of tabs 16 is not critical to the invention, and the one tab labeled in FIG. 1 is typical of the preferred number of four that are shown in their preferred locations. Four tabs 16 arranged as shown adequately hold a printed sheet or booklet in place without wrinkling or slippage.

Base 4 defines at least one media holding feature 7. Each media holding feature 7 is sized and shaped to accommodate a recording media piece 8, which is described in more detail below. As illustrated, five media holding features 7 are provided for the same number of media pieces 8, but this is not critical to the scope of the invention. The number of media holding features 7 and media pieces 8 is limited only by the number that will fit within jewel case 1, which of course depends on the dimensions of both jewel case 1 and recording media piece 8. The exact configuration and arrangement of the media pieces 8 is not critical to the scope of the invention, but for aesthetic and other reasons symmetrically balanced arrangements are preferred. Also, in the preferred embodiment shown, each media holding feature 7 is circular except for a flattened portion, but again this would depend on the exact form factor of recording media pieces 8.

In a preferred embodiment shown, the invention permits one or more pieces of data recording media, most preferably (but not necessarily) those using 32 mm diameter optical recording disks that are expected to be packaged together within conventionally sized jewel cases, such as jewel case 1. This provides cost-efficient manufacturing, distribution, and retail display.

One such possible embodiment of recording media is expected to be commercially available under the DATA-PLAY trade name ("DataPlay media"). DataPlay media are believed to be similar to those disclosed in International Patent Applications WO072312A2 entitled "Removable Optical Storage Device and System," and WO079526A1 entitled "Combination Mastered and Writeable Medium and Use in Electronic Book Internet Appliance," the entire contents of which are incorporated by reference. However, the scope of the invention includes other types and format of media provided they meet the other requirements described above.

The preferred mode of operation for media holding feature 7 is a recess integrated directly in base 4, such as by molding. The recess removably holds the media and any packaging directly associated with it (such as the clamshell-type container described below). For example, the recess could have "snap-in" features designed to mate with the shape and size of some or all of the media packaging. Most preferably, the media packaging may be opened to access the recording media without removing the media packaging from feature 7. The removability aspect ensures that the packaging and media may also be removed as an unopened unit entirely from base 4. If removed entirely, the media packaging (with or without the media remaining in it) may be replaced within the jewel case at a later time.

Alternatively, a separate insert piece (not shown) may serve the media holding role of base 4. Such an insert piece would have a shape and size to allow it to lie in a cavity defined by the shallow rectangular box configuration of base 4. In this alternative embodiment, suitable features on base 4 and/or the separate insert piece may be preferred so that the insert piece was adequately held in place as if it were an integral portion of base 4.

An optional theft deterrence tag 6 may be combined with jewel case 1 in any convenient manner or location. For example, it could be attached to base 4, as shown by way of example only in FIG. 1. The scope of the invention does not depend on the particular technology used in theft deterrence tag 6, and a variety of such technologies are well known and suitable for use with the invention.

Figure 2:
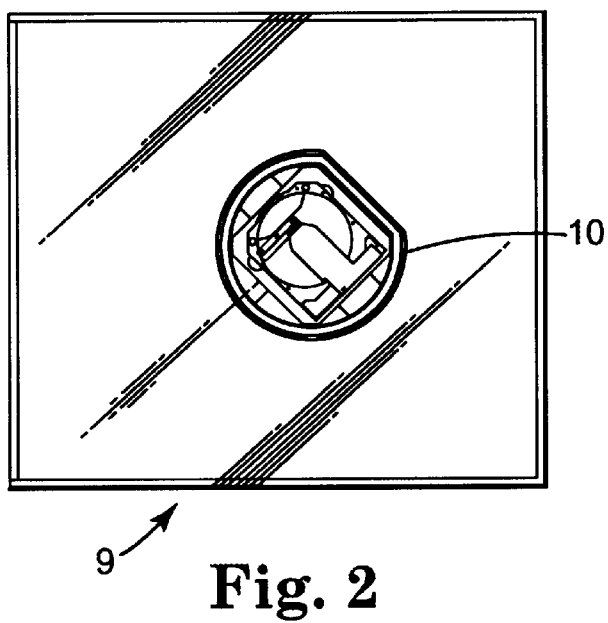
FIG. 2 is a front view of another feature of the invention, optionally usable with the embodiment of FIG. 1.

FIG. 2 is a front view of a preferred printed overlap 9 that may be used to surround the front, back, and one side (typically but not necessarily the hinged side) of jewel case 1. The front side is available for product identification and the like, and a single cutout 10 exposes the actual contents for inspection. The use of a single cutout 10 is preferred but not required. The back side of printed overlap 9 may display warranty information, Universal Product Code (UPC) data and barcode symbols, and so on. It is preferred but not required to place the UPC symbols in the vicinity of any theft deterrence tag 6 that may be used with jewel case 1, so that equipment which combines UPC scanners and tag deactivators may operate in a single pass through such equipment. The entirety of printed overlap 9 and jewel case 1 are typically encased in a transparent, removable material to create a single sealed unit for display and sales.

Figure 3:
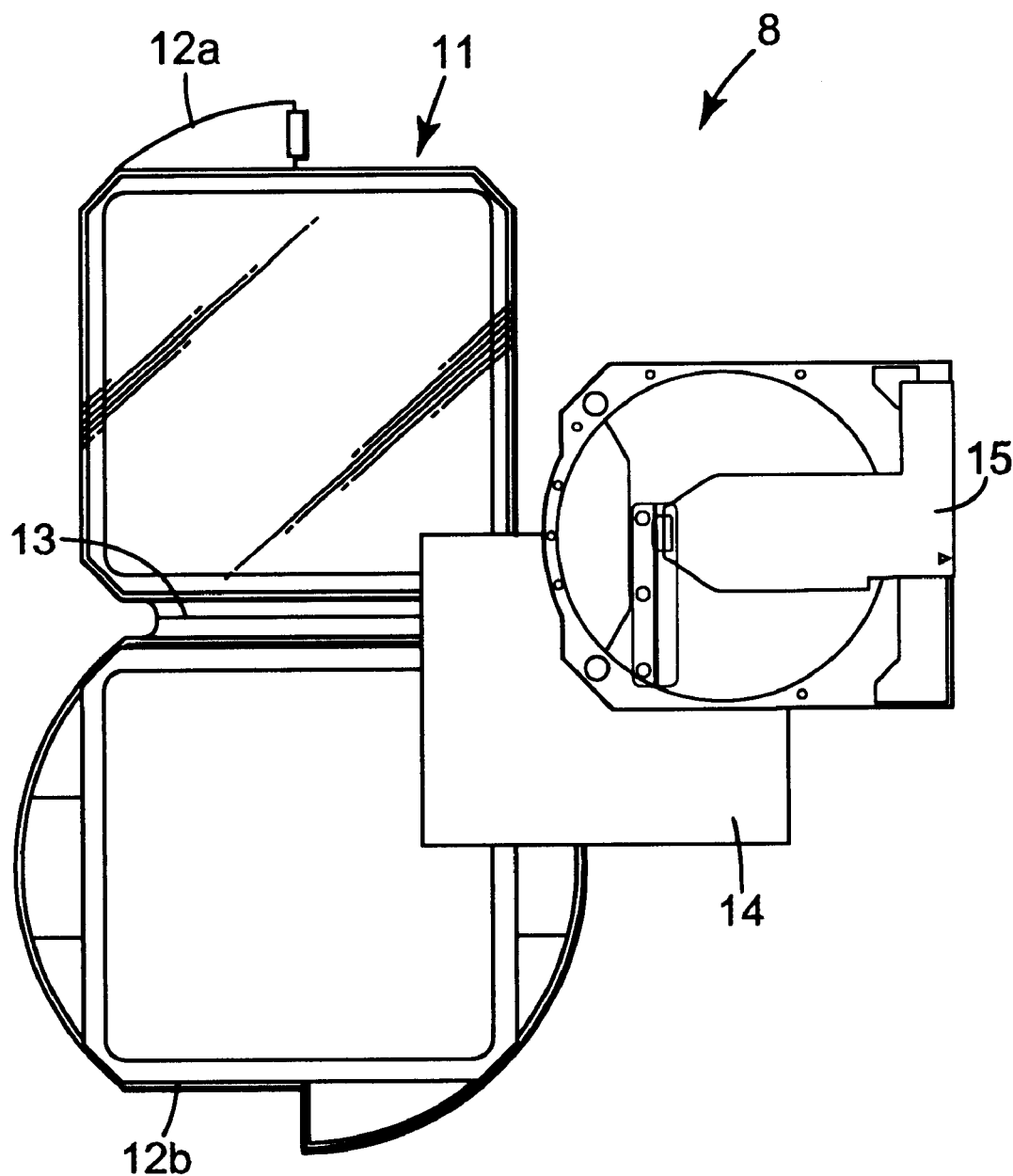
FIG. 3 is an exploded view of the media piece component of FIG. 1.

FIG. 3 shows a preferred embodiment of recording piece 8. Recording piece 8 is packaged within a clamshell-type container 11, which comprises two mating sides 12a, 12b joined by hinge 13. Clamshel container 11 is preferably transparent or translucent so that optional printed insert 14 can be read through sides 12a or 12b, and also to determine whether recording piece 8 is inside. When closed, the thickness of clamshell container 11 must be less than that of jewel case 1 and any other materials (such as any printed sheet or booklet that may be present), but it is optional whether the cross-sectional shape of either side 12a or 12b (or both) is flat or curved.

Optional printed insert 14 is sized and shaped to fit, along with the actual recording media 15, inside clamshell container 11 when the two sides 12a, 12b are brought together and closed to form recording piece 8. If used, printed insert 14 is preferably a relatively large multi-panel unit than can be folded to fit inside clamshell container 11 yet present a larger writing surface that a single panel piece would present. Printed insert 14 could be used to identify recording piece 8 (e.g., name of manufacturer, warranty information, and the like), identify the recorded or pre-recorded contents of recording media 15, and so on.

We claim:

1. A jewel case adapted for housing at least one piece of recording media, the jewel case comprising a generally rectangular base and a generally rectangular cover hinged to the base, having approximate dimensions of 140 mm in width, 125 mm in height, and 10 mm in thickness when the cover is closed, comprising: at least one media holding feature including a recess within the jewel case, the recess defining a partially rounded clamshell shape configured to hold a removable clamshell container for the recording media, the removable clamshell container having a thickness when closed less than the thickness of the jewel case when the jewel case is closed.

2. The jewel case of claim 1, adapted for housing a recording medium comprising a 32 mm diameter recording disk.

3. The jewel case of claim 1, wherein the recess is one of five recesses adapted for housing five pieces of recording media.

4. The jewel case of claim 1, in which the recess is integrated directly in the base.

5. The jewel case of claim 4, in which the recess is molded into the base.

6. The jewel case of claim 1, in which the media holding feature comprises a snap-in feature adapted to mate in shape and size with the clamshell.

7. The jewel case of claim 1, in which the media holding feature is adapted to permit the clamshell to be opened to access the recording media without removing the clamshell from the media holding feature.

8. The jewel case of claim 1, in which the media holding feature is adapted to permit the media packaging to be removed as an unopened unit.

9. The jewel case of claim 1, in which the media holding feature is adapted to permit the clamshell to be replaced within the jewel case after removal.

10. The jewel case of claim 1, in which the media holding feature is an insert piece adapted to lie in a cavity defined by the base.

11. The jewel case of claim 10, in which the media holding feature is held within the base.

12. The jewel case of claim 1, in combination with a theft deterrence tag.

13. The jewel case of claim 1, in combination with an overlap surrounding the jewel case.

14. The combination of a jewel case and at least one piece of recording media located within a removable clamshell container, the jewel case comprising a generally rectangular base and a generally rectangular cover hinged to the base, having approximate dimensions of 140 mm in width, 125 mm in height, and 10 mm in thickness when the cover is closed, and at least one media holding feature within the jewel case to hold the removable clamshell container for the recording media, the removable clamshell container having a thickness when closed less than the thickness of the thickness of the jewel case when the jewel case is closed, the clamshell container being held within the jewel case by the media holding feature.

15. The combination of claim 14, in which the clamshell container is transparent or translucent.

16. The combination of claim 14, in which the clamshell container comprises two mating sides and a cross-sectional shape of either side is flat.

17. The combination of claim 14, in which the clamshell container comprises two mating sides and a cross-sectional shape of either side is curved.

18. The combination of claim 14, wherein the clamshell container is partially rounded.

19. A jewel case comprising:

a generally rectangular base and a generally rectangular cover hinged to the base, the base and cover together defining approximate dimensions of 140 mm in width, 125 mm in height, and 10 mm in thickness; and a plurality of media holding features, each of the media holding features defining a partially rounded clamshell shape to receive a removable clamshell container for a piece of recording media.

20. The jewel case of claim 19, wherein the recess is sized to hold a clamshell container that contains a 32 mm diameter recording disk.

21. The jewel case of claim 19, wherein the media holding features include five recesses adapted to house five clamshell containers within the jewel case.

* * * * *